US008615607B2

(12) United States Patent
Bhayani et al.

(10) Patent No.: US 8,615,607 B2
(45) Date of Patent: Dec. 24, 2013

(54) IMPLEMENTATION OF ENDPOINTS AS JMX MBEANS IN AN INTEGRATED MEDIA AND JAVA EE APPLICATION SERVER

(75) Inventors: Amit Bhayani, Maharashtra (IN); Oleg Kulikov, Volgograd (RU)

(73) Assignee: Red Hat, Inc., Raleigh, NC (US)

( * ) Notice: Subject to any disclaimer, the term of this patent is extended or adjusted under 35 U.S.C. 154(b) by 1106 days.

(21) Appl. No.: 12/395,501

(22) Filed: Feb. 27, 2009

(65) Prior Publication Data

US 2010/0223614 A1 Sep. 2, 2010

(51) Int. Cl.
*G06F 15/16* (2006.01)

(52) U.S. Cl.
USPC .......................... 709/250; 709/218; 709/230

(58) Field of Classification Search
USPC ........................................................ 709/250
See application file for complete search history.

(56) References Cited

U.S. PATENT DOCUMENTS

| | | | |
|---|---|---|---|
| 6,584,186 B1* | 6/2003 | Aravamudan et al. ... | 379/201.03 |
| 6,775,362 B1* | 8/2004 | Ransom ...................... | 379/93.17 |
| 7,369,540 B1* | 5/2008 | Giroti ............................. | 370/352 |
| 2004/0028031 A1* | 2/2004 | Valin et al. ..................... | 370/352 |
| 2005/0018657 A1* | 1/2005 | Nakao et al. .................. | 370/352 |
| 2008/0162709 A1* | 7/2008 | Hrischuk et al. .............. | 709/230 |
| 2009/0007098 A1* | 1/2009 | Chevrette et al. ............. | 717/177 |
| 2009/0300155 A1 | 12/2009 | Ivanov et al. | |
| 2009/0300662 A1 | 12/2009 | Ivanov et al. | |

OTHER PUBLICATIONS

"The JBoss 4 Application Server Guide", Table of Contents, JBoss, 2004-2005, 9 pages.*
"The JBoss 4 Application Server Guide", Chapter 2, JBoss, 2004-2005, 70 pages.*
"Web 2.0 and Communications—Building Converged Applications", PowerPoint Slides, Feb. 15, 2008, Bhayani, 33 pages.*
Bhayani, "Web 2.0 and Communications—Building Converged Applications", Table of Presentations, Feb. 15, 2008, 2 pages.
USPTO, Office Action for U.S. Appl. No. 12/395,370 mailed Mar. 3, 2011.
USPTO, Final Office Action for U.S. Appl. No. 12/395,370 mailed Jul. 12, 2011.
USPTO, Advisory Action for U.S. Appl. No. 12/395,370 mailed Sep. 20, 2011.
USPTO, Office Action for U.S. Appl. No. 12/395,340 mailed Feb. 12, 2013.
USPTO, Final Office Action for U.S. Appl. No. 12/395,370 mailed May 20, 2013.
USPTO, Advisory Action for U.S. Appl. No. 12/395,370 mailed Jul. 29, 2013.

* cited by examiner

*Primary Examiner* — Richard G Keehn
(74) *Attorney, Agent, or Firm* — Lowenstein Sandler LLP

(57) ABSTRACT

In one embodiment, a mechanism for implementation of endpoints as Java™ Management Extensions (JMX) MBeans in an integrated media and Java™ Enterprise Edition (JAVA EE) application server is disclosed. In one embodiment, a system includes an integrated application server including a media server and Java™ Enterprise Edition (JAVA EE) deployed in a single Java™ virtual machine (JVM), and one or more endpoints in the media server deployed as Java Management Extension (JMX) Mbeans.

20 Claims, 5 Drawing Sheets

IMPLEMENTATION OF ENDPOINTS AS JMX MBEANS IN AN INTEGRATED MEDIA AND JAVA EE APPLICATION SERVER

RELATED APPLICATION

The present application is related to co-filed U.S. patent application Ser. No. 12/395,370 entitled "Mechanism for Collocation in a JAVA Virtual Machine of a Media Server and a JAVA EE Server," which is assigned to the assignee of the present application.

TECHNICAL FIELD

The embodiments of the invention relate generally to communication platforms and, more specifically, relate to a mechanism for implementation of endpoints as Java™ Management Extensions (JMX) MBeans in an integrated media and Java™ Enterprise Edition (JAVA EE) application server.

BACKGROUND

Voice over Internet Protocol (VoIP) has seen raise in popularity in recent times and has become more then just a telephony application. With the growing adoption of packet communications, service providers are transitioning from a voice-centric orientation for the connection and delivery of voice calls to a service-centric model focused on the rapid and efficient delivery of innovative, value-added services to enterprises and consumers.

The service delivery process requires the connection of user equipment (via media streams) to media processing equipment. This activity takes place under the direction of a service-provisioning layer. This duality is important because it retains flexibility and may permit considerable innovation in terms of future service offerings. In fact, media functionality is most commonly realized through the inclusion of dedicated Media Server platforms, the purpose of which is to provide unique and diverse services through common and shared media resource processing capabilities.

It is convenient to consider a media gateway as a collection of endpoints. An endpoint is a logical representation of a physical entity, such as an analog phone or a channel in a trunk. Endpoints are sources or sinks of data and can be physical or virtual. Physical endpoint creation requires hardware installation. An interface that terminates a trunk connected to a PSTN switch is an example of a physical endpoint. On the other hand, software is sufficient for creating a virtual endpoint. An audio source in an audio-content server is an example of a virtual endpoint. One current challenge faced involved with communications technology is the efficient implementation of virtual endpoints in an integrated communications platform.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
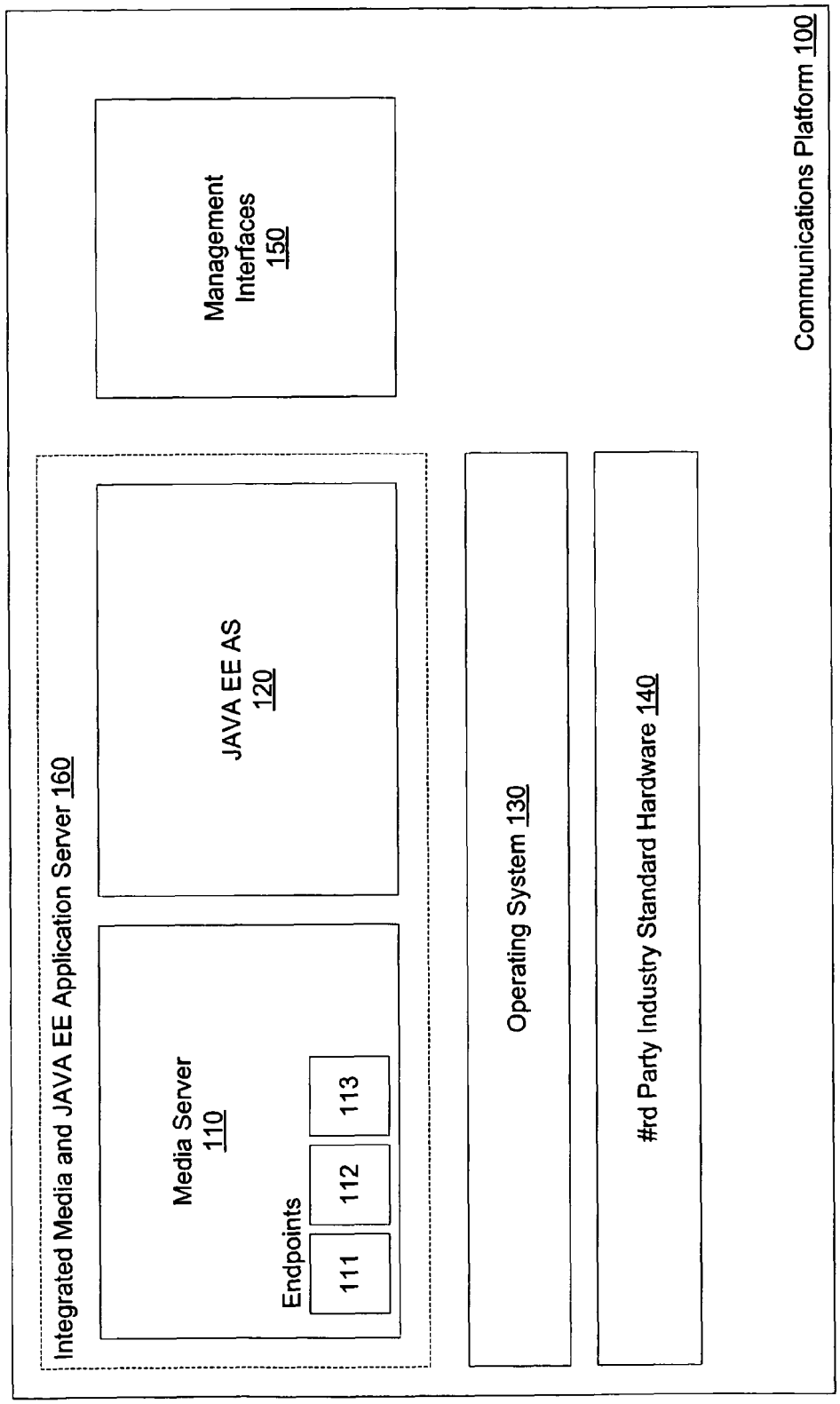
FIG. 1 is a block diagram depicting a communications platform that integrates a media server as an extension of JAVA™ Enterprise Edition (JAVA EE) according to one embodiment of the invention.

Embodiments of the invention provide for implementation of endpoints as Java™ Management Extensions (JMX) MBeans in an integrated media and Java™ Enterprise Edition (JAVA EE) application server. In one embodiment, a system for implementation of endpoints as JMX MBeans in an integrated media and JAVA EE application server includes an integrated application server including a media server and Java™ Enterprise Edition (JAVA EE) deployed in a single Java™ virtual machine (JVM), and one or more endpoints in the media server deployed as Java Management Extension (JMX) Mbeans.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Embodiments of the invention provide for implementation of endpoints as Java™ Management Extensions (JMX) MBeans in an integrated media and Java™ Enterprise Edition (JAVA EE) application server. FIG. 1 is a block diagram depicting a communications platform 100 that integrates a media server 110 as an extension of a JAVA™ Enterprise Edition (JAVA EE) server according to an embodiment of the invention. In one embodiment, communications platform 100 is a single JVM. A JVM is a set of computer software programs and data structures that use a virtual machine model for the execution of other computer programs and servers. In one embodiment, JVM 100 and its associated components are implemented on one or more computing devices. It also functions seamlessly across a range of Internet Protocol (IP) and communications networks, and can be accessed by computers, handsets, and other network-enabled devices.

Communications platform 100 integrates the media server 110 and JAVA EE application server 120 as an integrated media and JAVA EE application server 160. The integrated media and JAVA EE application server 160 enables the development, deployment and management of applications that integrated of voice, video and data across a range of networks and devices. In addition, communications platform 100 includes management interfaces 150 associated with the integrated media and JAVA EE application server 160.

The use of the modular JAVA EE architecture 120 with a media server 110 results in a simple and cleanly separable architecture for the implementation of embodiments of the invention. In one embodiment, endpoints 111, 112, 113 are implemented by the media server 110 and are installed as logically separate MBeans within a microkemel service of the JAVA EE. The endpoints 111-113 do not implement signaling logic, but rather are responsible for media generation and handling. The endpoints 111-113 provide voice and video interfaces for JAVA EE components (e.g., web pages, Enterprise JavaBeans (EJBs), etc) or legacy networks, and implement media processing functions such as transcoding, media insertion, echo cancellation, modulation/demodulation, and so on.

Endpoints 111-113 are a source and/or sink of data that may be physical or virtual. One example of a physical endpoint is an interface to a gateway that terminates a trunk connected to a Public Switch Telephone Network (PSTN) switch. Another example of a physical endpoint is an interface to a gateway that terminates an analog Plain Old Telephone System (POTS) connection to a phone or a PBX, for instance.

An example of a virtual endpoint is an Announcement endpoint that plays an audio file for a user agent (UA) (not shown). Another virtual endpoint is a Packet Relay endpoint, which is a specific form of a conference bridge that usually supports just two connections. A further example of a virtual endpoint is a Conference endpoint, which includes an Audio Mixer and is used for conference applications. Another example virtual endpoint is an Interactive Voice Response (IVR) endpoint that is used for recording, collecting, and generating dual tone multi-frequency (DTMF) signals and other tones. Yet another virtual endpoint may be an Echo endpoint, which generally echoes the audio from a UA and is mostly used for testing the line between a user agent and the media server 110.

In one embodiment, the integrated media and JAVA EE application server 160 is a single integrated stack, with the media server 110 and JAVA EE 120 running in the same JVM 100. As illustrated, the integrated media and Java EE application server 160 includes an operating system 130 and third party industry standard hardware 140. In one embodiment, the JAVA EE component 120 may be a JBoss application server distributed by Red Hat, Inc. of Raleigh, N.C. In another embodiment, the operating system may Red Hat Enterprise Linux system.

Figure 2:
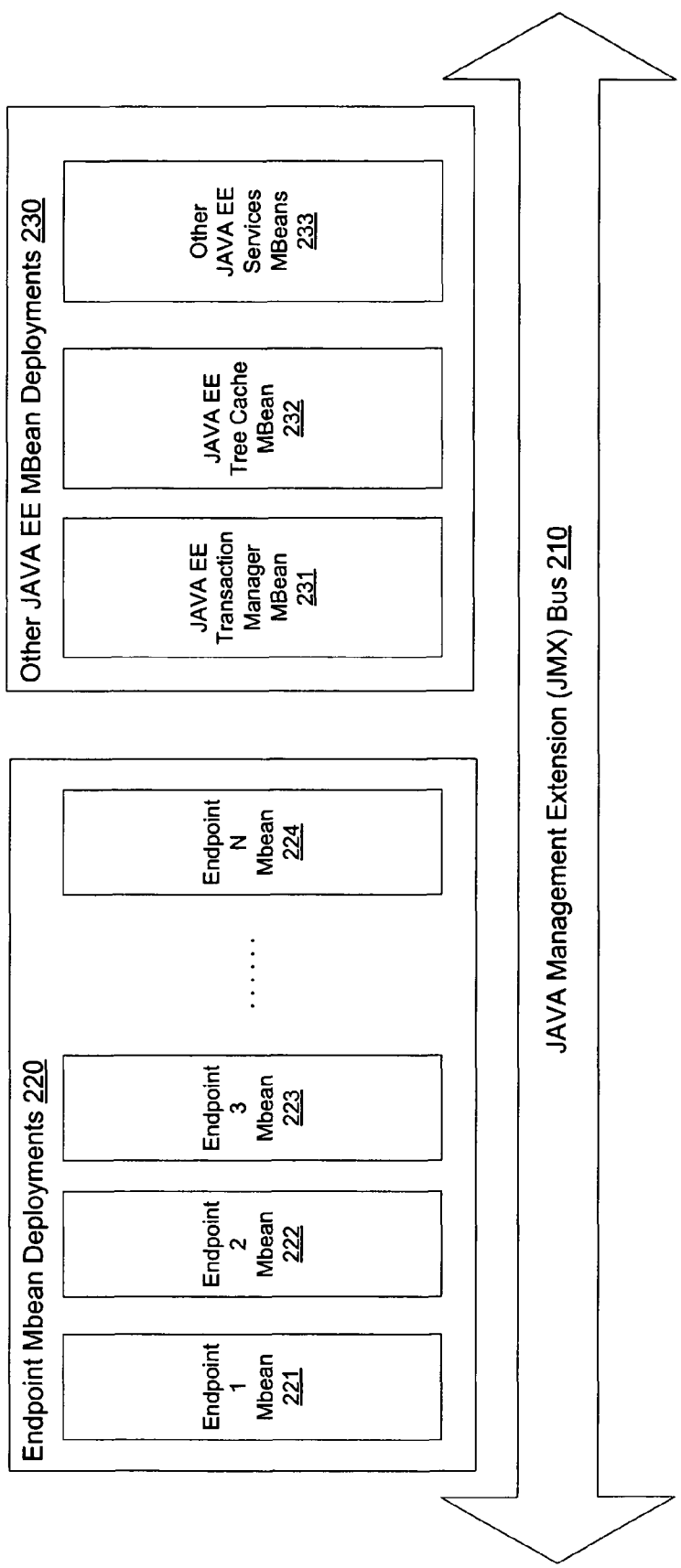
FIG. 2 is a block diagram illustrating endpoints implemented as MBeans that are deployed as J2EE services according to an embodiment of the invention.

In one embodiment, the management interfaces 150 allow the integrated media and Java EE application server 160 to be managed through Java Management Extensions(JMX) Mbeans. FIG. 2 is a block digram that depicts endpoints 221-224 hosted by a media server as JAVA EE services according to an embodiment of the invention. In one embodiment, endpoints 221-224 are the same as endpoints 111-113, described with respect to FIG. 1.

JMX 200 is a JAVA technology that supplies tools for managing and monitoring applications, system objects, devices (e.g., audio devices), and service-oriented networks. Those resources are represented by objects called MBeans (for Managed Bean). Some well-known MBean implementations include the JAVA EE transaction manager MBean 231 and the tree cache MBean 232, as well as other JAVA EE services 233. In one embodiment of the invention, endpoints 221-224 of a media server may also be implemented as MBeans, as shown in FIG. 2 As all JAVA EE components export their management MBean, each endpoint 221-221 of the media server should also export its MBean.

Figure 3:
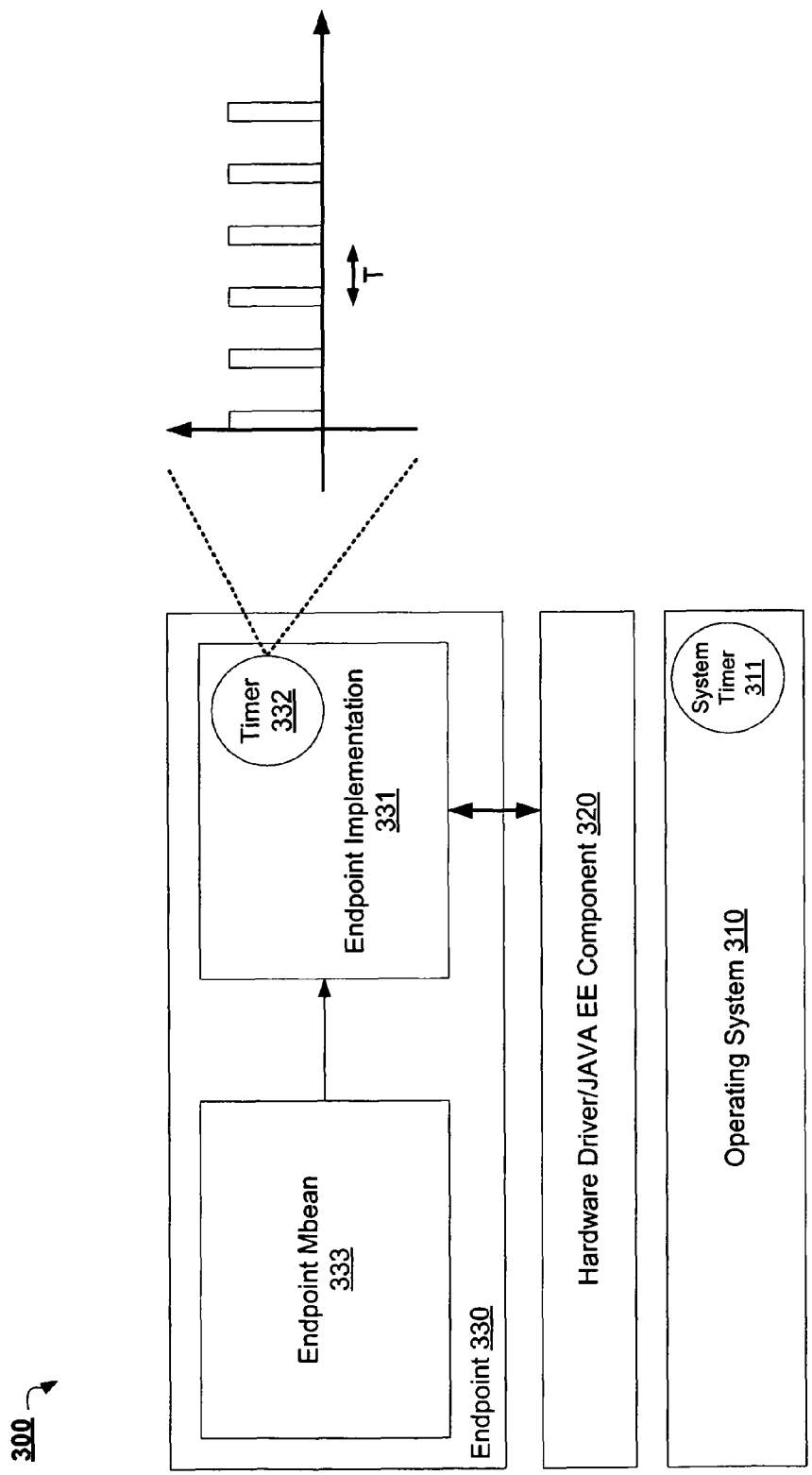
FIG. 3 is a block diagram depicting an endpoint architecture according to an embodiment of the invention.

FIG. 3 is a block diagram depicting an endpoint architecture 330 according to an embodiment of the invention. In one embodiment, endpoint architecture 330 represents the architecture of any of endpoints 111-113 described with respect to FIG. 1. Endpoint architecture 330 includes an MBean 333 and an endpoint implementation 331.

In one embodiment, endpoint implementation 331 includes a timer 332 that generates sequence of time marks on a regular time basis. In one embodiment, timer 332 is synchronized with either a system timer 311 or with a source timer (not shown), if provided. Upon each time mark by the timer 332, the endpoint implementation 331 makes requests to the underlying hardware or software layer 310, 320 to generate a chunk of real-time media that represents the time interval [T*n−T*(n+1)] seconds, where T is period of packetization and n is a number of timer marks in T.

Figure 4:
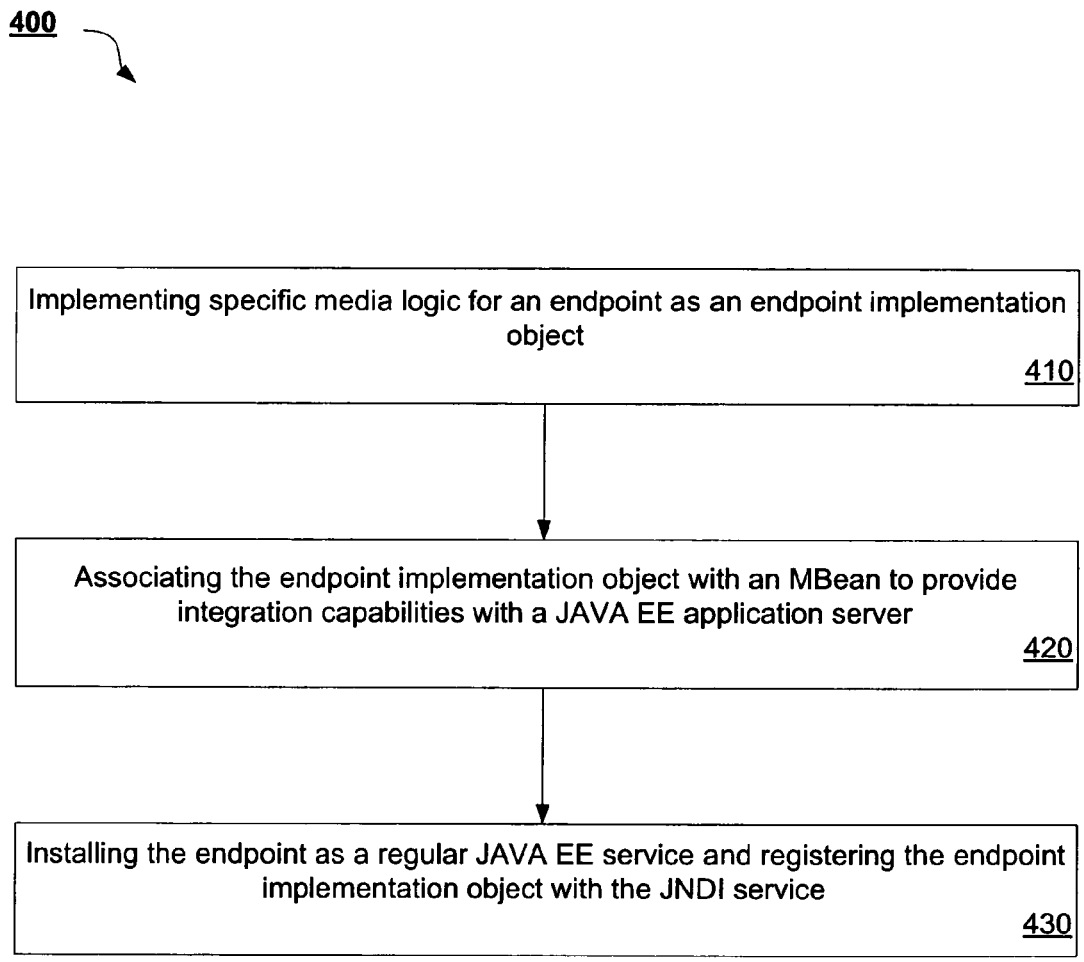
FIG. 4 is a flow diagram illustrating a method implementing endpoints as JMX MBeans in an integrated media and JAVA EE application server according to an embodiment of the invention.

FIG. 4 is a flow diagram illustrating a method 400 for method implementing endpoints as JMX MBeans in an integrated media and JAVA EE application server according to an embodiment of the invention. Method 400 may be performed by processing logic that may comprise hardware (e.g., circuitry, dedicated logic, programmable logic, microcode, etc.), software (such as instructions run on a processing device), or a combination thereof. In one embodiment, method 400 may be performed by JVM 100 described with respect to FIG. 1.

Method 400 begins at block 410, where an endpoint implements the specific media logic for the endpoint, such as announcement logic, transcoding logic, conference logic, interactive voice response (IVR) logic, and so on, as an endpoint implementation object. Then, at block 420, an MBean is associated with the endpoint implementation object to provide integration capabilities with a JAVA EE application server. Lastly, at block 430, a JAVA EE service deployer installs the endpoint as a regular JAVA EE service and registers the endpoint implementation object with the Java Naming and Directory Interface (JNDI) service.

Figure 5:
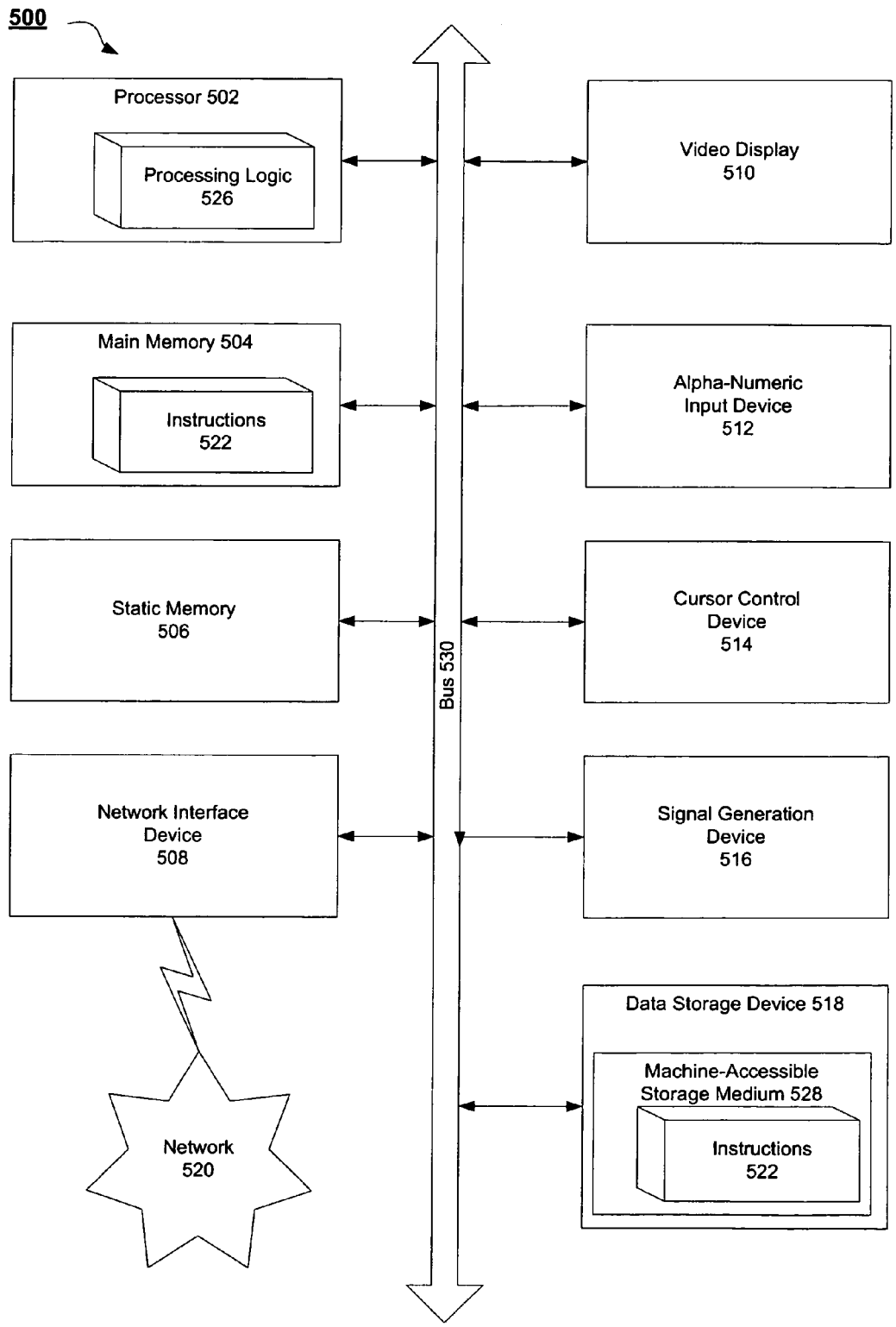
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to implement embodiments of communications platform 100 described with respect to FIG. 1, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system, comprising:
   a memory;
   a processing device to execute a Java™ virtual machine (JVM) from the memory;
   an integrated application server executable from the memory by the processing device, the integrated application server deployed in the JVM and comprising:
      a media server deploying one or more endpoints as Java Management Extension (JMX) MBeans; and
      a Java TM Enterprise Edition (JAVA EE) application server sharing a common microkernel architecture with the media server via installation of the one or more endpoint JMX MBeans of the media server as logically-separate services of a microkernel of the JAVA EE application server; and one or more management interfaces communicably coupled to the integrated application server, the one or more management interfaces to manage the one or more endpoints via interactions with the JMX MBeans of the one or more endpoints installed as logically-separate services of the microkernel of the JAVA EE application server.

2. The system of claim 1, wherein the common microkernel architecture is based on JMX.

3. The system of claim 2, wherein the one or more management interfaces further to provide interfaces to one or more management applications that manage the media server using a decoupled invocation technique specified by the JMX architecture.

4. The system of claim 3, wherein the one or more management application is located in the JVM that the media server implementation is located.

5. The system of claim 3, wherein the one or more endpoints deployed as JMX Mbeans emit a notification to be consumed by at least one of other endpoints of the one or more endpoints or the one or more management applications.

6. The system of claim 1, wherein the one or more endpoints in the media server communicate with one another via one or more local in-VM pass-by reference semantics.

7. The system of claim 1, wherein the one or more endpoints comprise at least one of a T1 line endpoint, an El line endpoint, a fax line endpoint, a Time Division Multiplexing line endpoint, an Interactive Voice Response (IVR) endpoint, an Announcement endpoint, a Conference endpoint, an Echo endpoint, or a Packet Relay endpoint.

8. The system of claim 1, wherein each endpoint of the one or more endpoints comprises a timer that generates a sequence of time marks, wherein at each time mark the endpoint provides a request to the media server to generate a portion of media that represents a time interval [T*n−T*(n+1)] seconds, where T is period of packetization and n is a number of timer marks in T.

9. A computer-implemented method, comprising:

executing, by a computing device, media logic for an endpoint as an endpoint implementation object, wherein the endpoint is deployed in a media server of the computing device;

associating, by the computing device, the endpoint implementation object with a Java Management Extensions (JMX) Managed Bean (MBean) to provide interaction capabilities for the endpoint with a JAVA Enterprise Edition (JAVA EE) application server;

installing, by the computing device, the JMX MBean associated with the endpoint as a logically-separate service of a microkernel of the JAVA EE application server, wherein the installing the JMX Mbean associated with the endpoint as a JAVA EE microkernel service creates an integrated application server comprising the media server and the JAVA EE application server sharing a common microkernel architecture on the computing device; and managing, by one or more management interfaces communicably coupled to the integrated application server, the one or more endpoints via interactions with the JMX MBeans of the one or more endpoints installed as logically-separate services of the microkernel of the JAVA EE application server.

10. The method of claim 9, further comprising registering the endpoint with a Java Naming and Directory Interface (JNDI) service.

11. The method of claim 9, wherein the media server implementation and the JAVA EE application server are deployed in a single Java™ virtual machine (JVM) to create the integrated application server.

12. The method of claim 11, wherein the endpoint comprises a timer that generates a sequence of time marks, wherein at each time mark the endpoint provides a request to the media server to generate a portion of media that represents a time interval [T*n−T*(n+1)] seconds, where T is period of packetization and n is a number of timer marks in T.

13. The method of claim 9, wherein the common microkernel architecture is based on JMX.

14. The method of claim 13, wherein the endpoint emits a notification that is consumed by at least one of other endpoints or one or more management applications that manage the media server using a decoupled invocation technique specified by the common microkernel architecture based on JMX.

15. The method of claim 9, wherein the endpoint comprises at least one of a T1 line endpoint, an El line endpoint, a fax line endpoint, a Time Division Multiplexing line endpoint, an Interactive Voice Response (IVR) endpoint, an Announcement endpoint, a Conference endpoint, an Echo endpoint, or a Packet Relay endpoint.

16. A non-transitory machine-readable storage medium including data that, when accessed by a processing device, cause the computing device to perform operations comprising:

executing, by the processing device of a computing device, media logic for an endpoint as an endpoint implementation object, wherein the endpoint is deployed in a media server of the computing device;

associating, by the computing device, the endpoint implementation object with a Java Management Extensions (JMX) Managed Bean (MBean) to provide interaction capabilities for the endpoint with a JAVA Enterprise Edition (JAVA EE) application server;

installing, by the computing device, the JMX MBean associated with the endpoint as a logically-separate service of a microkernel of the JAVA EE application server, wherein the installing the JMX Mbean associated with the endpoint as a JAVA EE microkernel service creates an integrated application server comprising the media server and the JAVA EE application server sharing a common microkernel architecture on the computing device; and managing, by one or more management interfaces communicably coupled to the integrated application server, the one or more endpoints via interactions with the JMX MBeans of the one or more endpoints installed as logically-separate services of the microkernel of the JAVA EE application server.

17. The non-transitory machine-readable storage medium of claim 16, wherein the machine-readable storage medium includes data that, when accessed by the computing device, cause the computing device to perform further operations comprising registering the endpoint with a Java Naming and Directory Interface (JNDI) service.

18. The non-transitory machine-readable storage medium of claim 16, wherein the media server and the JAVA EE application server are deployed in a single Java™ virtual machine (JVM) to create the integrated application server.

19. The non-transitory machine-readable storage medium of claim 18, wherein the endpoint emits a notification that is consumed by at least one of other endpoints or one or more management applications that manage the media server using a decoupled invocation technique specified by the common microkernel architecture based on JMX.

20. The non-transitory machine-readable storage medium of claim 16, wherein the endpoint comprises at least one of a T1 line endpoint, an E1 line endpoint, a fax line endpoint, a Time Division Multiplexing line endpoint, an Interactive Voice Response (IVR) endpoint, an Announcement endpoint, a Conference endpoint, an Echo endpoint, or a Packet Relay endpoint.

* * * * *

UNITED STATES PATENT AND TRADEMARK OFFICE
CERTIFICATE OF CORRECTION

| | |
|---|---|
| PATENT NO. | : 8,615,607 B2 |
| APPLICATION NO. | : 12/395501 |
| DATED | : December 24, 2013 |
| INVENTOR(S) | : Amit Bhayani et al. |

It is certified that error appears in the above-identified patent and that said Letters Patent is hereby corrected as shown below:

In the Claims

In claim 5, column 7, line 21, delete "Mbeans" and insert --MBeans--;

In claim 9, column 7, line 53, delete "Mbeans" and insert --MBeans--; and

In claim 16, column 8, line 42, delete "Mbeans" and insert --MBeans--.

Signed and Sealed this
Twenty-eighth Day of October, 2014

Michelle K. Lee
*Deputy Director of the United States Patent and Trademark Office*